(12) United States Patent
Isaak et al.

(10) Patent No.: US 10,078,410 B1
(45) Date of Patent: Sep. 18, 2018

(54) SYSTEM TO LOCOMOTE AN ENTITY IN THREE DIMENSIONAL SPACE

(71) Applicant: Electronic Arts Inc., Redwood City, CA (US)

(72) Inventors: Jeremy Luke Isaak, Langley (CA); Samuele Rigamonti, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 549 days.

(21) Appl. No.: 14/740,008

(22) Filed: Jun. 15, 2015

Related U.S. Application Data

(60) Provisional application No. 62/140,373, filed on Mar. 30, 2015.

(51) Int. Cl.
*G06F 3/048* (2013.01)
*A63F 13/5375* (2014.01)

(52) U.S. Cl.
CPC .......... *G06F 3/048* (2013.01); *A63F 13/5375* (2014.09)

(58) Field of Classification Search
None
See application file for complete search history.

(56) References Cited

U.S. PATENT DOCUMENTS

| | | | |
|---|---|---|---|
| 9,104,308 B2 | 8/2015 | Au et al. | |
| 9,772,743 B1 | 9/2017 | Mueller et al. | |
| 2004/0070567 A1* | 4/2004 | Longe | G06F 3/0236 345/156 |
| 2007/0195067 A1* | 8/2007 | Zotov | G06F 3/0418 345/179 |
| 2007/0236475 A1 | 10/2007 | Wherry | |
| 2007/0265081 A1* | 11/2007 | Shimura | A63F 13/10 463/37 |
| 2008/0288878 A1* | 11/2008 | Hayashi | H04M 1/274525 715/762 |
| 2010/0302155 A1 | 12/2010 | Sands et al. | |
| 2011/0172013 A1 | 7/2011 | Shirasaka et al. | |
| 2011/0285636 A1* | 11/2011 | Howard | G06F 3/04815 345/173 |

(Continued)

OTHER PUBLICATIONS

YouTube Video: Geometry Wars Touch for iPad, retrieved from https://www.youtube.com/watch?v=JunHFvBIQ2E, uploaded on Apr. 3, 2010, transcript as accessed on Sep. 9, 2015, 0:00-3:23, with 11 screenshots, 13 pages.

*Primary Examiner* — Jason Skaarup
(74) *Attorney, Agent, or Firm* — Knobbe, Martens, Olson & Bear, LLP

(57) ABSTRACT

The disclosure includes embodiments directed to a system for controlling the operation of the character that can recognize and process touch inputs at any location on the touchscreen. The system can track the movement of a touch input and generate a game command, such as movement of a character, based on the received touch input. The game command can be stored in a movement buffer. If the position of the touch input changes, the system can update the game command based on the movement of the touch input. If the movement of the touch input exceeds a directional threshold, the system can clear the movement buffer and initiate a new game command based on the touch input. This allows for new game commands to correspond to quick changes in direction provided by the user.

19 Claims, 13 Drawing Sheets

(56) References Cited

U.S. PATENT DOCUMENTS

2013/0222272 A1* 8/2013 Martin, Jr. .......... G06F 3/04883
  345/173
2014/0364214 A1* 12/2014 Ayoub .................... A63F 13/06
  463/31
2016/0283078 A1* 9/2016 Lin ....................... G06F 3/0488

* cited by examiner

SYSTEM TO LOCOMOTE AN ENTITY IN THREE DIMENSIONAL SPACE

This application claims priority to U.S. Provisional Application No. 62/140,373, filed on Mar. 30, 2015 and titled "SYSTEM TO LOCOMOTE AN ENTITY IN THREE DIMENSIONAL SPACE," which is hereby incorporated herein by reference in its entirety.

BACKGROUND

Generally, in video games, a user can manipulate a physical input device, such as a game controller, keyboard, joystick, mouse, and/or other input device, in order to interact with the video game. The physical input device can include buttons, joysticks, control pads, and other types of physical control elements that can be manipulated to control the operation of characters, objects, and/or entities within a game environment. The rise in popularity of mobile devices, such as, for example, smartphones, tablets, and the like, along with advances in touchscreen technology, have provided a growing market for touchscreen enabled game applications. In order to control or manipulate the game environment without a physical input device, many touchscreen-enabled game applications attempt to emulate the physical control elements with virtual control elements displayed on the touchscreen. The virtual control elements can be manipulated with touch inputs in a manner similar to their physical counterparts.

SUMMARY OF EMBODIMENTS

The systems, methods and devices of this disclosure each have several innovative aspects, no single one of which is solely responsible for the all of the desirable attributes disclosed herein.

One embodiment discloses a computer-implemented method for touch-based control of a game application, the method comprising: by a hardware processor executing a game application, receiving, by the game application, a touch input via a touchscreen; determining, by the game application, first movement data associated with the touch input, wherein the first movement data defines a first direction; storing, by the game application, the first movement data in a movement buffer; determining, by the game application, a movement command for an entity within a game environment based, at least in part on the first movement data stored in the movement buffer; determining, by the game application, second movement data associated with the touch input, wherein the second movement data defines a second direction; determining, by the game application, whether the second movement data associated with the touch input overcomes a directional threshold by comparing the first movement data to the second movement data, wherein the directional threshold defines an angular value; if the second movement data satisfies the directional threshold, clearing the first movement data from the movement buffer; storing the second movement data in the movement buffer; and determining a movement command for a character within the game environment based, at least in part on the second movement data stored in the movement buffer; if the second movement data does not overcome the directional threshold, storing the second movement data in the movement buffer with the first movement data; and determining a movement command for a character within a game environment based, at least in part on the first movement data and the second movement data.

Another embodiment discloses a system for touch-based control of a game application, comprising: a data store configured to store game application data; a hardware processor in communication with the data store and a touch screen interface, the touchscreen interface configured to translate tactile inputs received through a touchscreen into touch input data based on the characteristics of the tactile inputs, the hardware processor configured to execute a game application based, at least in part, on the game application data, wherein the game application is configured to: receive first input data associated with a tactile input; store the first input data in a buffer; execute a command for an entity within a game application based, at least in part on the first touch input data stored in the movement buffer; receive second input data associated with the tactile input; based on a determination that the second input data overcome a directional threshold relative to the first input data, clear the first movement data from the movement buffer, wherein the directional threshold defines an angular value; store the second input data in the movement buffer; and determine a command for a character within the game environment based, at least in part on the second input data stored in the movement buffer.

Another embodiment discloses a non-transitory computer readable medium comprising computer-executable instructions for touch-based control of a game application that, when executed by a computer, cause the computer to perform a method comprising: receiving first input data associated with a tactile input; storing the first input data in a buffer; executing a command for an entity within the game application based, at least in part on the first input data stored in the movement buffer; receiving second input data associated with the tactile input; based on a determination that the second input data overcome a directional threshold relative to the first input data, clearing the first input data from the movement buffer, wherein the directional threshold defines an angular value; storing the second input data in the movement buffer; and determining a command for an entity within the game environment based, at least in part on the second input data stored in the movement buffer.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
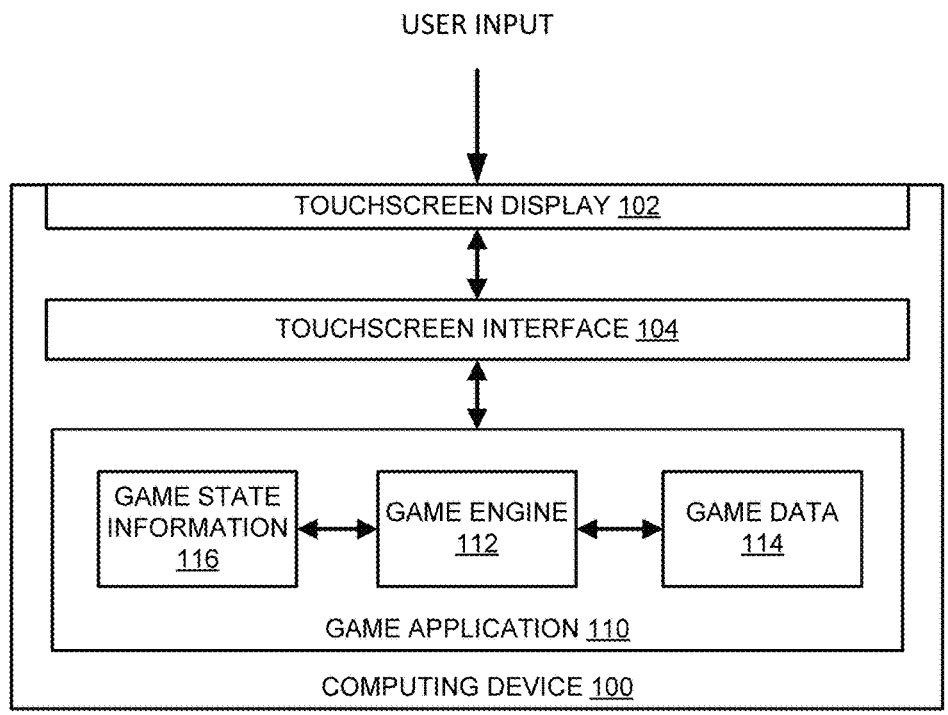
FIG. 1 illustrates an embodiment of a touchscreen computing device.

Embodiments of the present disclosure provide systems and methods for implementing a touch-based control system on a touchscreen computing device. Some control systems in touchscreen environments attempt to recreate physical game controllers. However, there are numerous limitations associated with attempting to emulate physical game controllers in a virtual environment. For example, a physical analogue control stick has a default state, or dead zone, in which no input is provided by the controller. If implemented in a virtual control environment, such as a touchscreen, a user would be forced to traverse the dead zone portion of the touchscreen in order to move in an opposite direction. Thus, there exists a need for touchscreen gaming controls that are configured to implement touchscreen controls without incorporating the limitations associated with attempting to emulate physical controllers in a virtual environment.

One solution for addressing the above mentioned deficiencies is a control system for controlling the operation of the character that can recognize and process touch inputs at various locations on the touchscreen. The system can track the movement of a touch input and store touch input information in a movement buffer. In some embodiments, the velocity and/or direction of touch inputs can be determined based on the stored touch input information. The system can generate a game command, such as movement of a character, based on the received touch input information. The game command can be stored in the movement buffer and can continue to execute the received command as long as the touch input is being received, in the same manner as a physical analogue stick. The movement buffer, and consequently, the game command can be continuously or periodically updated based on the received touch inputs. For example, if the position of the touch input changes, the system can update the game command based on the movement of the touch input. The system can also implement a system to detect sharp changes in direction, such as, moving from side to side. If the movement of the touch input exceeds a directional threshold, the system can clear the movement buffer and initiate a new game command based on the touch input. This allows for new game commands to correspond to quick changes in direction provided by the user without necessitating a need for the touch input to traverse a virtual dead zone. Advantageously, in certain embodiments, the touch-based control system can reduce control latency and increase responsiveness of touch-based controls.

Although this disclosure focuses on videogames, it should be understood that embodiments described herein can be used with other types of software applications that utilize touch-based control systems. For example, an application that positions elements in three-dimensional space or navigates in a virtual environment may use one or more embodiments of the present disclosure. Such as, for example, a global positioning device interface, a computer aided drawing application or video editing application.

Overview of Game System

FIG. 1 illustrates an embodiment of a touchscreen computing device 100, also referred to as a gaming system. The computing device 100 includes a touchscreen display 102 and a touchscreen interface 104, and is configured to execute a game application 110. The computing device 100 can include one or more processors, such as central processing units (CPUs), graphics processing units (GPUs), and data storage combined or in separate elements. In some embodiments, the computing device 100 can be a specialized computing device created for the purpose of executing game applications 110. The game applications 110 executed by the computing device 100 may be created using a particular application programming interface (API) or compiled into a particular instruction set that may be specific to the computing device 100. In some embodiments, the computing device 100 may be a general purpose computing device capable of executing game applications 110 and non-game applications. For example, the computing device 100 may be a laptop with an integrated touchscreen display or desktop computer with an external touchscreen display. Components of an example embodiment of a computing device 100 are described in more detail with respect to FIG. 8.

The touchscreen display 102 can be capacitive touchscreen, a resistive touchscreen, surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 102. The touchscreen interface 104 can be configured to translate the touch input into data and output the data such that it can be interpreted by components of the computing device 100, such as an operating system and the application 110. The touchscreen interface 104 can translate characteristics of the tactile touch input touch into touch input data. Example characteristics of a touch input can include, shape, size, pressure, location, direction, momentum, duration, and/or other characteristics. The touchscreen interface 104 can be configured to determine the type of touch input, such as, for example a tap (for example, touch and release at a single location) or a swipe (for example, movement through a plurality of locations on touchscreen in a single touch input). The touchscreen interface 104 can be configured to detect and output touch input data associated with multiple touch inputs simultaneously. The touchscreen interface 104 can be configured to detect movement of the touch inputs. The touch input data can be transmitted to components of the computing device 100 for processing. For example, the touch input data can be transmitted directly to the application 110 for processing.

In some embodiments, the touch input data can undergo processing and/or filtering by the touchscreen interface 104, an operating system, or other components prior to being output or provided to the game application 110. As one example, raw touch input data can be captured from a touch input. The raw data can be filtered to remove background noise, pressure values associated with the input can be measured, and location coordinates associated with the touch input can be calculated. The type of touch input data provided to the game application 110 can be dependent upon the specific implementation of the touchscreen interface 104 and the particular API associated with the touchscreen interface 104. In some embodiments, the touch input data can include location coordinates of the touch input. The touch signal data can be output at a defined frequency. Processing the touch inputs can be computed many times per second and the touch input data can be output to the game application for further processing.

A game application 110 can be configured to be executed on the computing device 100. The game application 110 may also be referred to as a videogame, a game, game code and/or a game program. A game application should be understood to include software code that a computing device 100 can use to provide a game for a user to play. A game application 110 may comprise software code that informs a computing device 100 of processor instructions to execute, but may also include data used in the playing of the game, such as data relating to constants, images and other data structures. For example, in the illustrated embodiment, the game application includes a game engine 112, game data 114, and game state information 116.

The touchscreen interface 104 or another component of the computing device 100, such as the operating system, can provide data representing user input, such as touch inputs, to the game application. In some embodiments, the computing device 100 may include additional user input devices, such as a mouse, a keyboard, a camera, a game controller, or the like. The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. During execution of the game application 110, the game application 110 can store game state information 116, which can include a game state, character states, environment states, scene object storage, and/or other information associated with a state of execution of the game application 110. For example, the game state information 116 can identify the state of the game application at a specific point in time, such as a character position, character action, game level attributes, and other information contributing to a state of the game application. The game state information can include dynamic state information that continually changes, such as character movement positions, and static state information, such as the identification of a game level within the game.

The game engine 112 can receive the user inputs and determine in-game events, such as actions, collisions, runs, throws, attacks and other events appropriate for the game application 110. During operation, the game engine 112 can read in game data 114 and a game state information 116 to determine the appropriate in-game events. In one example, after the game engine 112 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

Touch-Based Manipulation of a Game Environment

Figure 2:
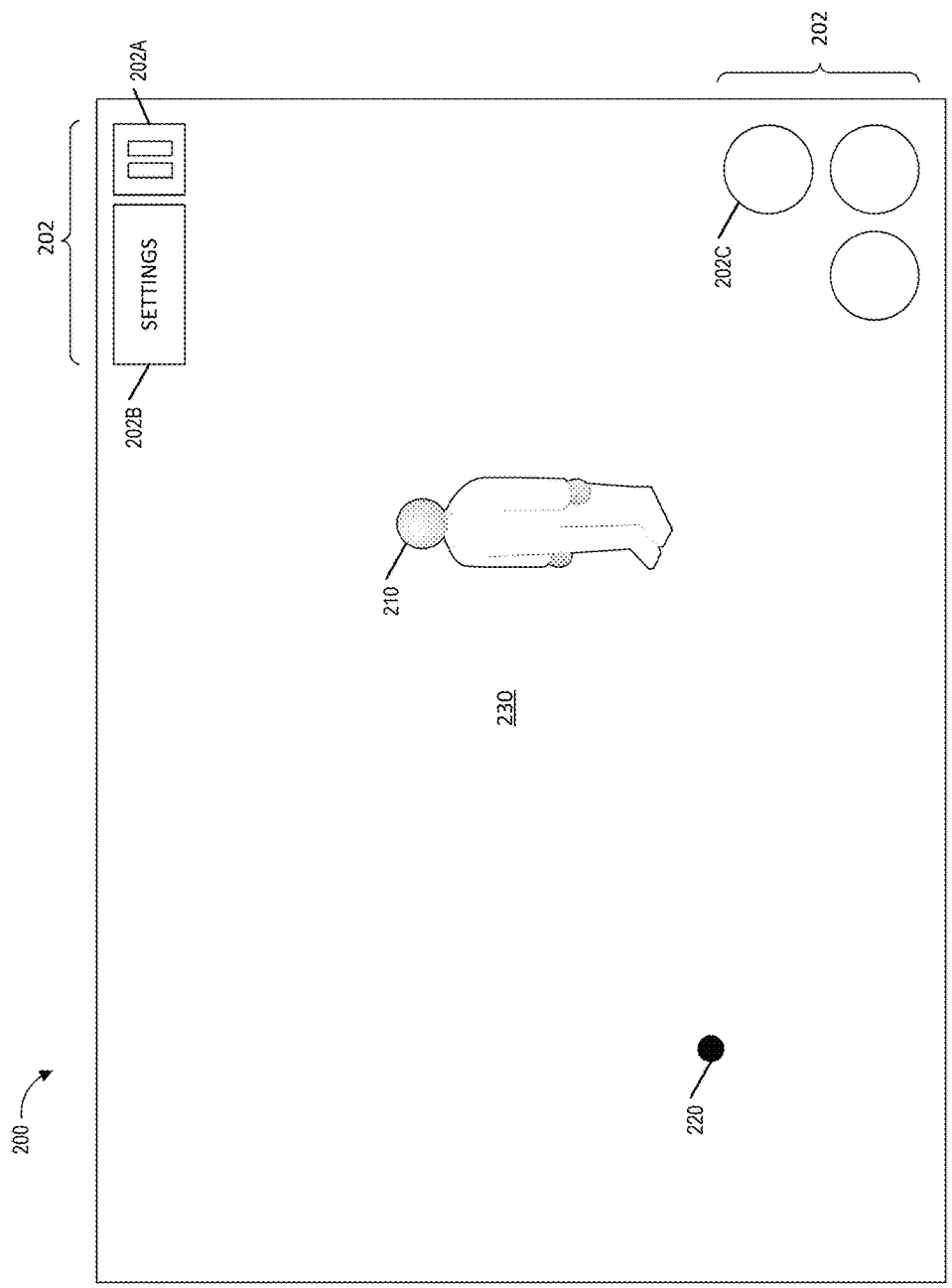
FIG. 2 illustrates an embodiment of an interface of a touchscreen device that implements a touch-based control system.

FIG. 2 illustrates an embodiment of a screen 200 of a touchscreen device 100 that implements a touch-based control system in accordance with some embodiments of the present disclosure. The touchscreen device 100 may correspond to any type of device having a display screen that allows for tactile inputs from a user through the display screen, such as a smartphone, tablet computer, handheld gaming system, controller associated with a gaming console, laptop computer, or personal computer system, car console display, and/or the like. As used in the present disclosure, a touch input may correspond to any type of tactile input that may be received by a touchscreen device. For example, a touch input may be generated by a user touching a touchscreen of a touchscreen device using one or more fingers. In some embodiments, a touch input may be generated in other ways, such as by using a stylus or pointer, or an optical input, such as a laser pointer.

The illustrated embodiment of screen interface 200 displays a touch input 220 and a gaming environment 230 that includes a character, object, or other type of entity 210 associated with the game. For simplicity, the entity is referred to herein as a character 210, though it may refer to any user-controlled entity within a game environment, such as a vehicle, an object, and/or any other entity. The interface 200 includes an example of a touch input 220 received by the touchscreen device. The character 210 may be controlled by the user using the one or more touch inputs 220 and/or other control means as appropriate for the computing device, such as one or more buttons, a control pad, and/or the like. For example, in some embodiments, a touch input 220 may be used to control the operation of a character 210 within a two or three-dimensional game environment.

The touch input 220 can be processed by a game engine 112. The touchscreen device can transmit the signal information received from the touch input to the game engine 112. The game engine 112 can process the information associated with touch input 220 to control operation of the character 210 within the game environment 230. The game engine 112 can use game data 114, such as game rules, and/or game state information 116 to process the touch input 220. The game rules can be specific to the game application 110. For example, when a touch input 220 is received, the game engine 112 can evaluate the characteristics of the touch input according to the specific game rules and the specific game state in order to determine the type of commands or functions that will be executed by the character 210 within the game environment.

In some embodiments, the interface 200 may display one or more virtual buttons 202 that may be manipulated based on touch inputs received from the user. For example, the screen may display a pause button 202A that allows the user to pause the game, and a settings button 202A that displays a settings menu allowing the user to view and/or change game settings. For example, settings may comprise display options for the game, control options for the game, and/or the like. In some embodiments, virtual buttons 202C may include one or more gameplay buttons. A gameplay button may cause an action to be performed by character 210 in the game environment. In some embodiments, the buttons displayed on the screen may move or change based, at least in part, upon a game mode of the game. For example, a first set of buttons may be displayed in connection with a first game mode, while a second set of buttons may be displayed in connection with a second game mode. In some embodiments, the computing device 100 may include physical buttons, which may be used to manipulate or control the game and/or game environment.

Figure 3A:
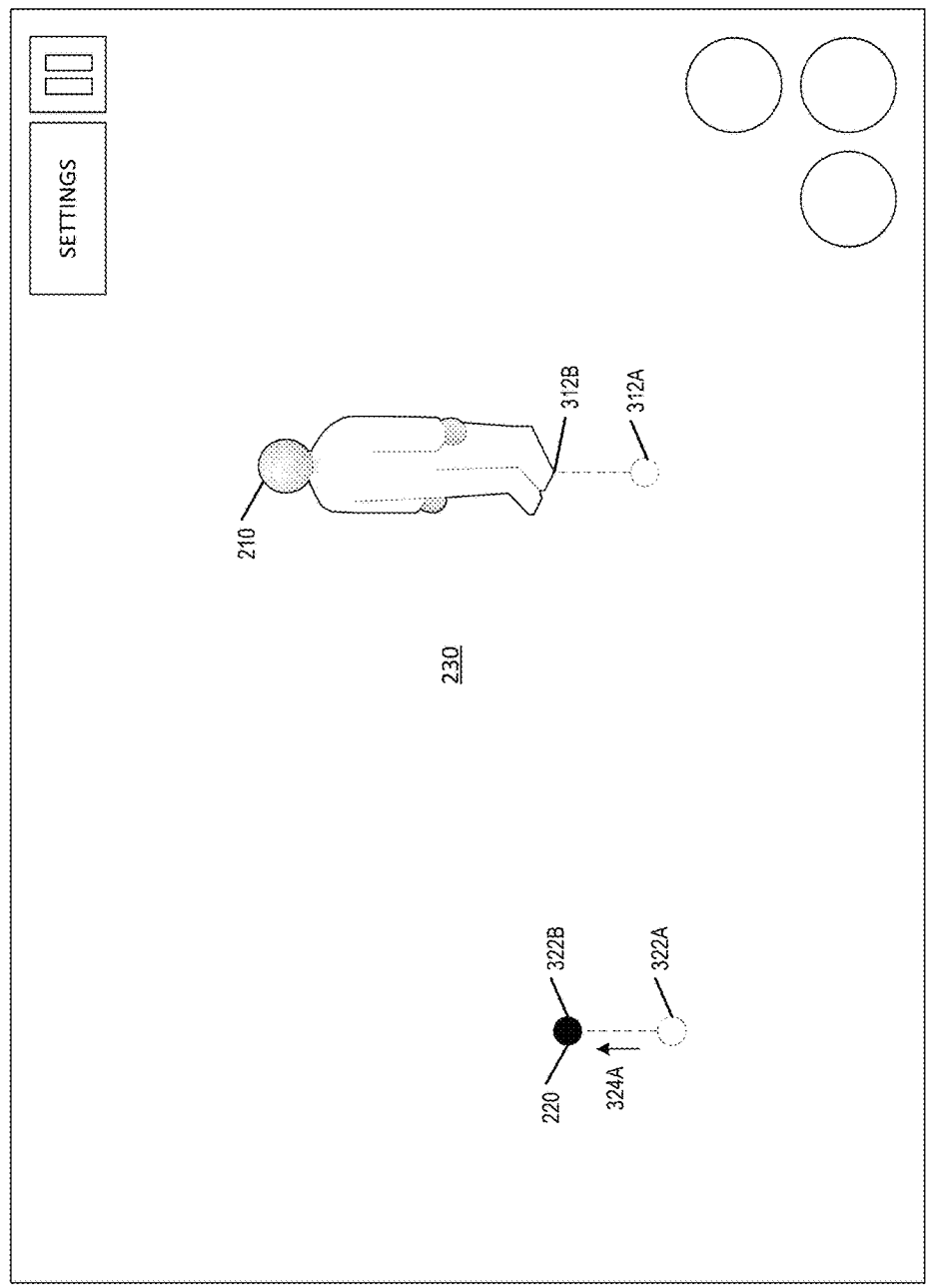
FIGS. 3A and 3B illustrate an embodiment of an interface of a touchscreen device that implements a touch-based control system.

FIG. 3A illustrates an example embodiment of movement of a character 210 within the game environment 230 based on a touch input 220. The movement of a character 210 can be based on a touch input 220 received by the touchscreen device. The locations of the touch input 220 include a first position 322A that moves to a second position 322B. The movement of the touch input 220 from position 322A to 322B is associated with touch input data, also referred to as touch input parameters, provided to the game engine 112. The arrow 324A illustrates direction and magnitude of the touch input 220 as it is moved from positions 322A to 322B. The game engine 112 can process the touch input parameters to control movement of the character 210 within the game environment. Movement of the character can be controlled in two-dimensional (2D) and/or three-dimensional (3D) space, which can be based on the specific game application 110. Movement can be the same as the touch input 220, in an amount proportional to the touch input 220, or in a translated amount.

In the illustrated example, movement can be controlled by the touch input 220 received by the touchscreen 200. The character 210 initially starts at a position 312A and moves to a position 312B based on the touch input 220, which moved from position 322A to position 322B. The control of the character 210 by the touch input 220 can be based on the relative change in position from the initial position 322A to the second position 322B. The touch input parameters associated with the touch input 220 can be received and processed by the game engine 112. The touch input parameters can include direction and magnitude (such as speed or momentum) of the touch input 220. The touch input parameters received by the game engine 112 can then be used to determine how to execute an action, such as move the character 210 within the game environment 230.

When a touch input 220 is received, a movement buffer, which may be implemented as a ring buffer, can be used to store touch input parameters associated with the touch input 220. The information stored in the movement buffer can be processed as a movement command for the character 220. The movement buffer, and consequently, the movement command can be continuously or periodically updated based on the received touch inputs 220. As illustrated in FIG. 3A, as the movement of the touch input 220 moves from the first position 322A to the second position 322B, the movement buffer stores the movement information and generates an associated movement command. In some embodiments, the movement information continues to be stored in the movement buffer and the movement command can continue to be executed by the game engine 112 until the touch input 220 is no longer detected (for example, the user removing his finger). In some embodiments, velocity and/or direction of the touch input can be calculated based on information stored in the movement buffer. For example, the velocity of the touch input may be determined by determining displacements between sequential inputs within the buffer. In some embodiments, the directional information can be smoothed by averaging directional inputs stored in the movement buffer.

Figure 3B:
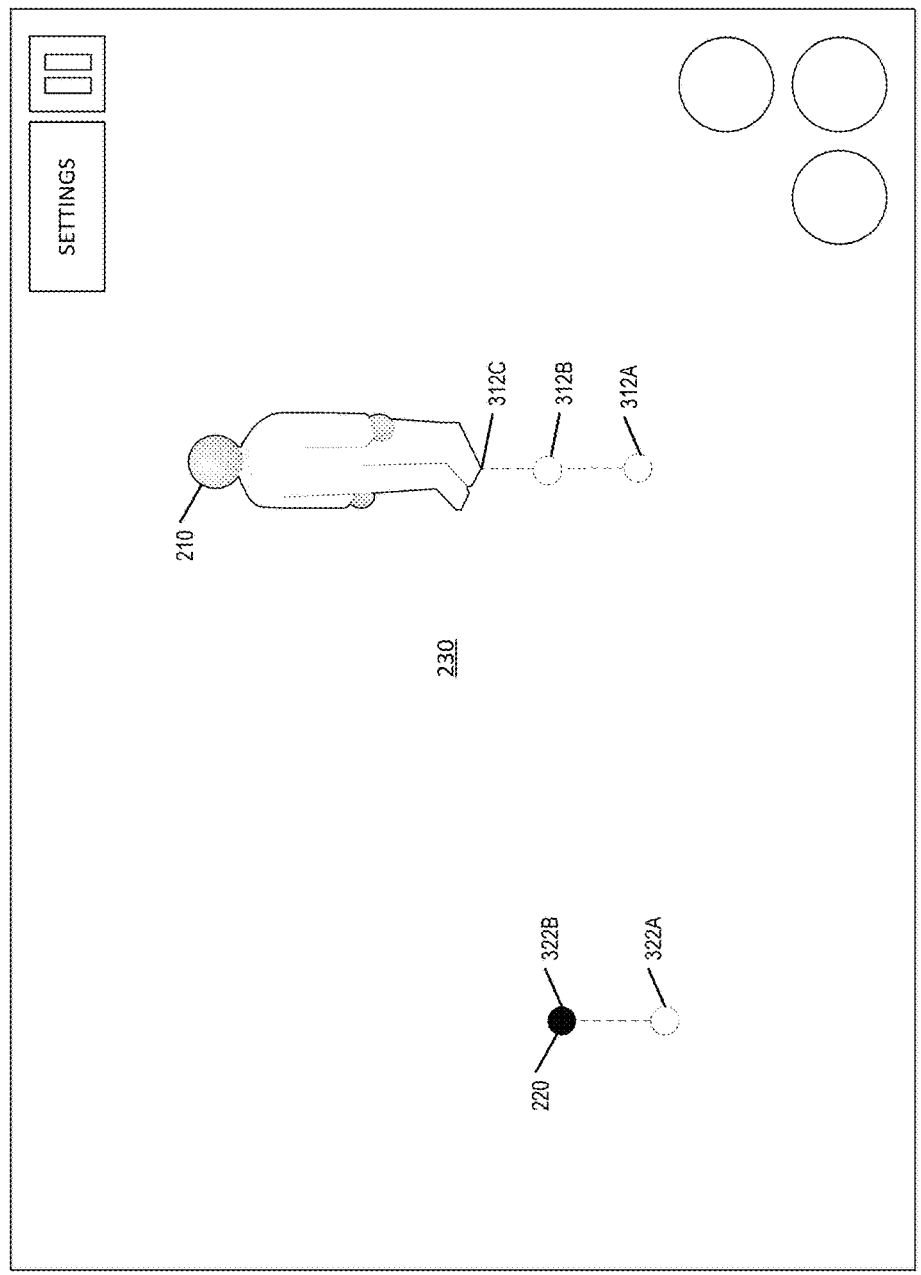

FIG. 3B illustrates an example of the continued execution of a movement command stored within the movement buffer. In the illustrated example, the touch input 220 moved between the first position 322A and the second position 322B. The character 210 initially moved from position 312A to a second position 312B, as illustrated in FIG. 3A, and has moved further to a third position 312C, as based on the same touch input. Similar to a physical joystick, when a physical joystick is positioned in the up position the character will continue to move in that direction until the joystick is released. In a similar manner, the movement buffer continues to store and implement the movement command associated with the touch input 220 until the touch input is removed. In this example embodiment, the movement of the touch input 220 from 322A to 322B defines a direction and a speed at which the character 210 moves within the game environment. The game engine can continue to execute the movement command and the character 210 will continue to move in the same direction until the touch input 220 changes or is no longer being received by the game engine 112. For example, if the user lifts up his finger and removes the touch signal, the movement buffer will be cleared and the game engine 112 will not provide a command for executing within the game environment 230.

Figure 4A:
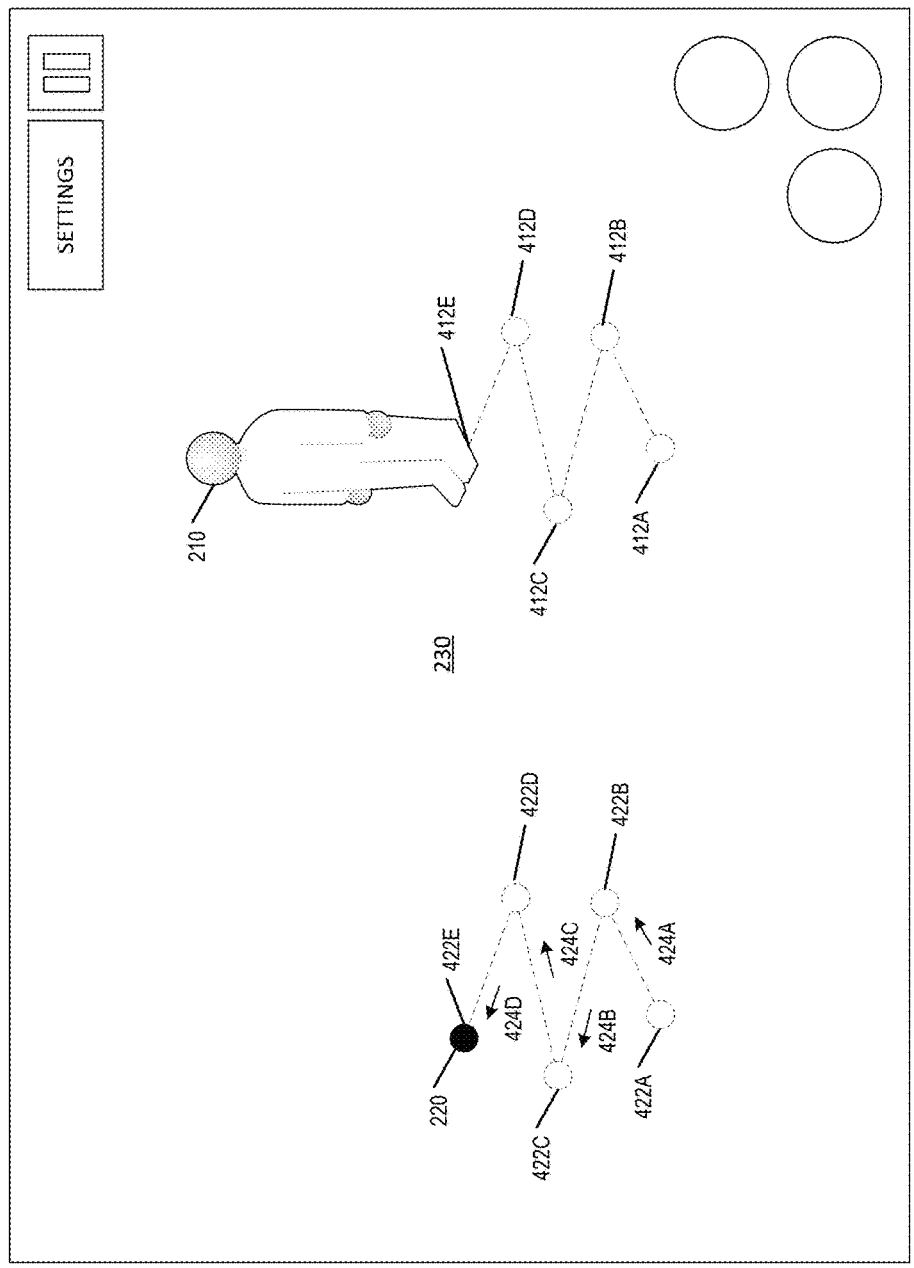
FIGS. 4A, 4B, 4C, and 4D illustrate an embodiment of an interface of a touchscreen device that illustrates additional aspects of a touch-based control system.

FIGS. 4A through 4D illustrate embodiments of additional aspects of the illustrated touch-based control system. FIG. 4A illustrates a process for dynamic pivoting. Advantageously, in some embodiments, dynamic pivoting can be used to quickly control movement of the character within the game environment while reducing control latency. In the illustrated embodiment, a path of movement of the touch input 220 is illustrated by locations 422A through 422E. Additionally arrows 424A, 424B, 424C, and 424D are illustrated. The arrows 424A-E illustrate direction and the magnitude of the touch input 220 as it moved between the positions 422A through 422E. Additionally, the movement of the character 210 along the movement path 412 is illustrated by movement path locations 412A through 412E.

The game engine 112 receives and processes the touch input parameters associated with the locations 422A through 422C. The game engine 112 can execute commands to move the character within the game environment 230 through corresponding positions 422A through 422E.

The positions 422B, 422C, and 422D illustrate positions where the touch input 220 changed directions. In some embodiments, at each of positions, 422B, 422C, and 422D, the movement buffer is cleared and a new movement command is executed. This process can be implemented by using a directional threshold. The directional threshold can be based on a change in angular position between touch inputs. When a specific angular value is exceeded between positions, the threshold is satisfied, and the movement buffer is cleared. A new movement command can then be implemented without consideration of previous touch input parameters. In some embodiments, an angular threshold can be 30 degrees, 45 degrees, 60 degrees or another defined value. The angular threshold can be computed by determining the new direction (such as directional vector 424B) of the touch input relative to the previous direction (such as directional vector 424A) of the touch input. The game engine 112 can determine the specific parameters of the directional threshold.

For example, movement from position 422A to position 422B of the touch input 220 is illustrated by the movement arrow 424A, which shows direction and magnitude of the touch input. When the movement of the touch input shifts at location 422B in a different direction towards 422C, a directional threshold is used to determine whether to continue using the existing information stored in the movement buffer or to clear the movement buffer and implement a new movement command. When that directional threshold is exceeded the game engine clears the buffer and processes the user input 220 as a new command. By clearing the movement buffer, the system can provide for directional control that can quickly change between different directions. By doing this, in some embodiments, the movement command can change quickly rather than slowing down in one direction and then shifting to the other direction.

As illustrated, at positions 422B, 422C, and 422D the directional threshold is exceeded by the change in position of the user input 220. The corresponding movement of the character 210 in positions 412A-412E illustrates corresponding changes in direction. Advantageously, in certain embodiments, this can provide quick movement of touch inputs in different directions and eliminate a control dead zone that can be problematic in a touchscreen environment.

Figure 4B:
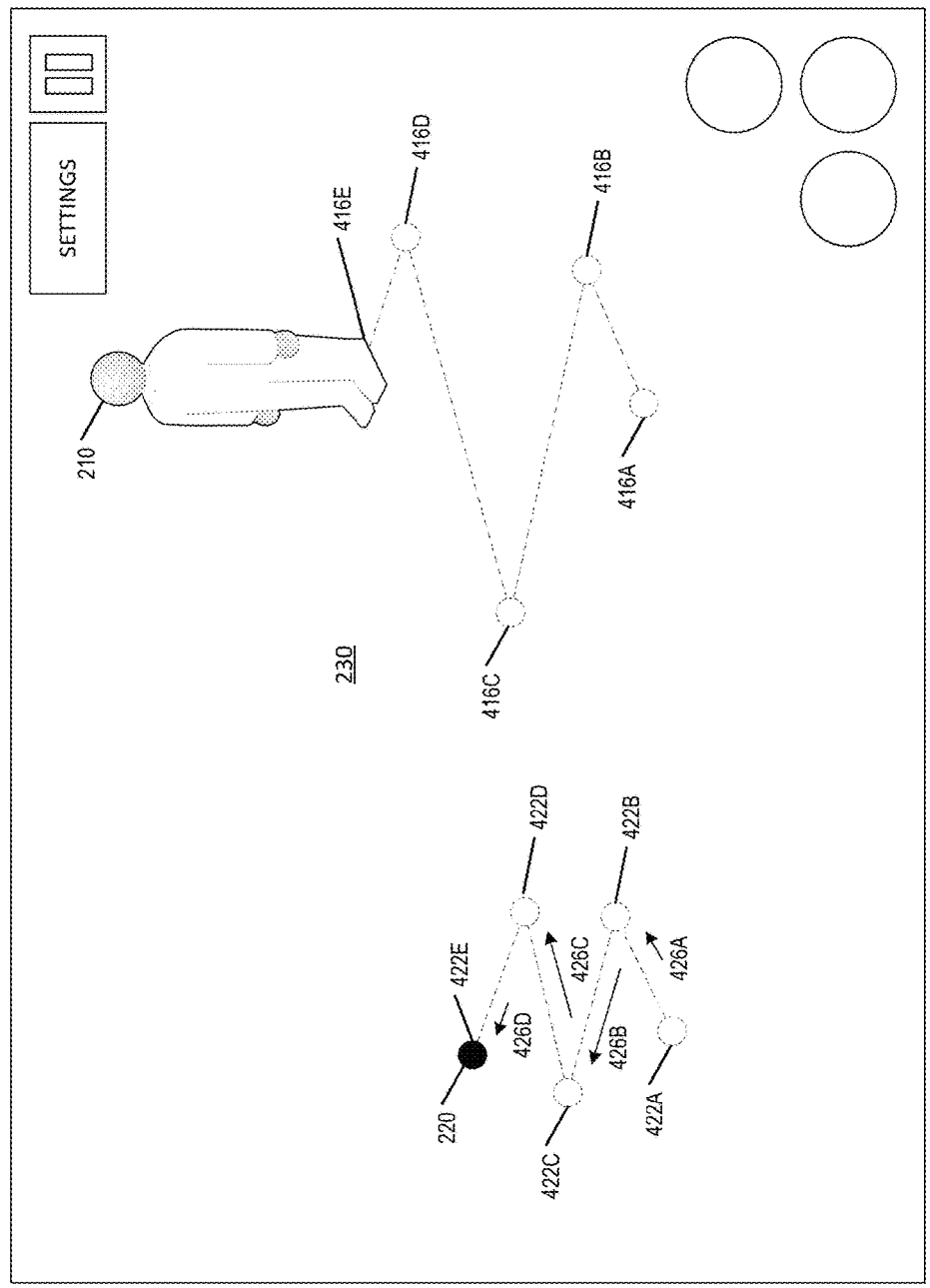

FIG. 4B illustrates another embodiment of dynamic pivoting illustrating user inputs 220 having varying magnitudes. The arrows 426A and 426D are similar to the arrows 424A and 424D in FIG. 4A. However the arrows 426B and 426C are larger, representing an increased momentum from the touch input 220, thereby resulting in greater movement of the character 210 in the game environment. For example, the speed at which the touch input 220 is moved from positions 422B to 422C can control the speed at which the character in the game environment moves. As illustrated, the actual positions of the touch inputs between FIGS. 4A and 4B are substantially the same. However, the magnitude or speed at which the touch input is received is much greater in FIG. 4B, resulting in an increased movement distance from locations in 416B to 416C and from 416C to 416D.

Figure 4C:
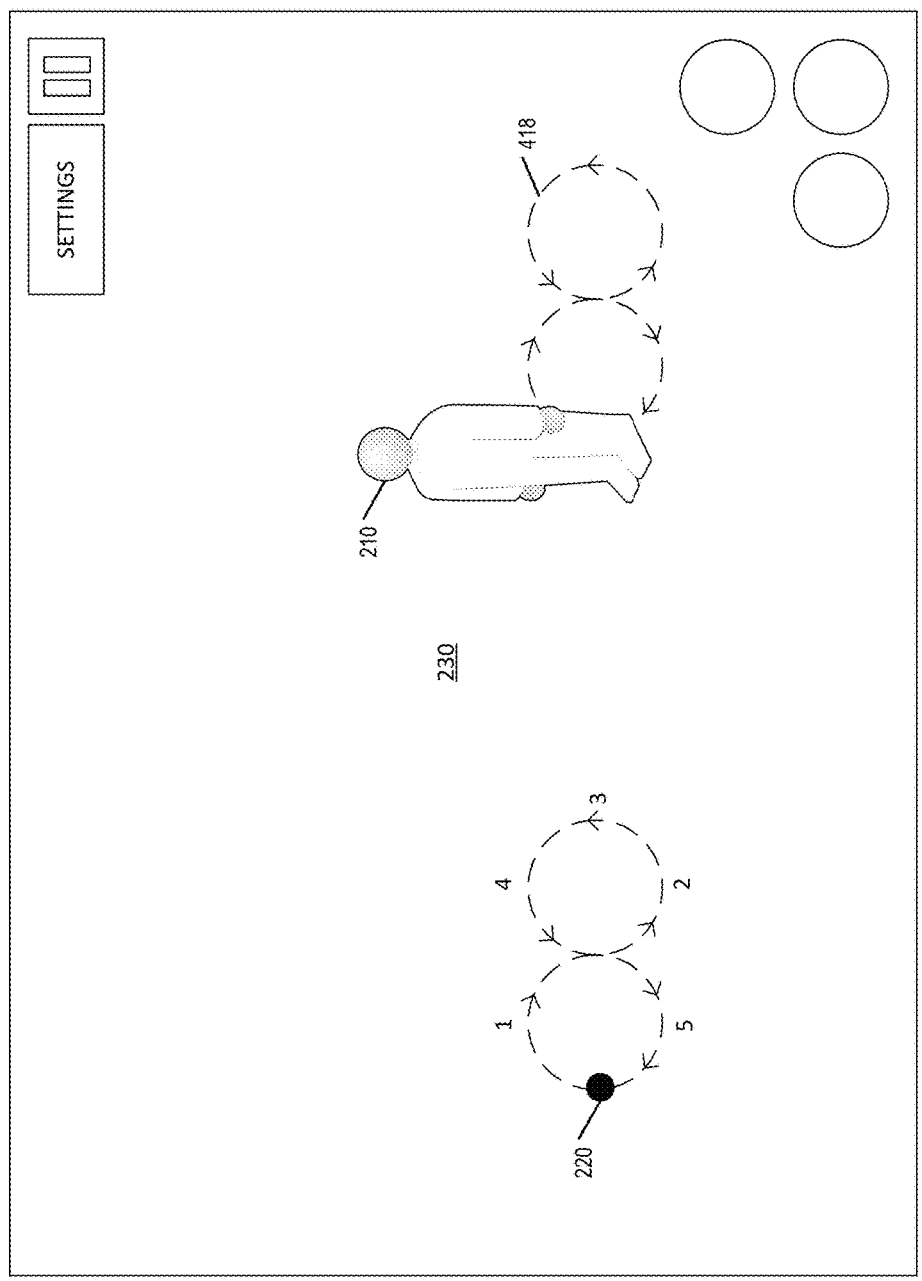

FIG. 4C illustrates an embodiment where there is no dynamic pivoting. In this embodiment, the directional threshold is not exceeded during movement of the user input 220. The directional threshold is not overcome, and the movement buffer is not cleared. The character moves based on the position of the touch input 220. As the touch input moves from its initial position to position 1 through 5 and back to its original position, the touch input 220 continuously updates the movement command according to the touch input parameters. The character 210 is moved along the path 418, which is based on the touch input, and the movement buffer is not cleared. The movement buffer can be a limited size where as additional commands are received, the older commands can be removed from the buffer using a first-in-first-out (FIFO) process. The game engine 112 can determine the movement command based on the data stored in the buffer. For example, in some embodiments, the game engine 112 can continually update the movement command by blending new touch inputs with the existing touch input information stored within the movement buffer.

Figure 4D:
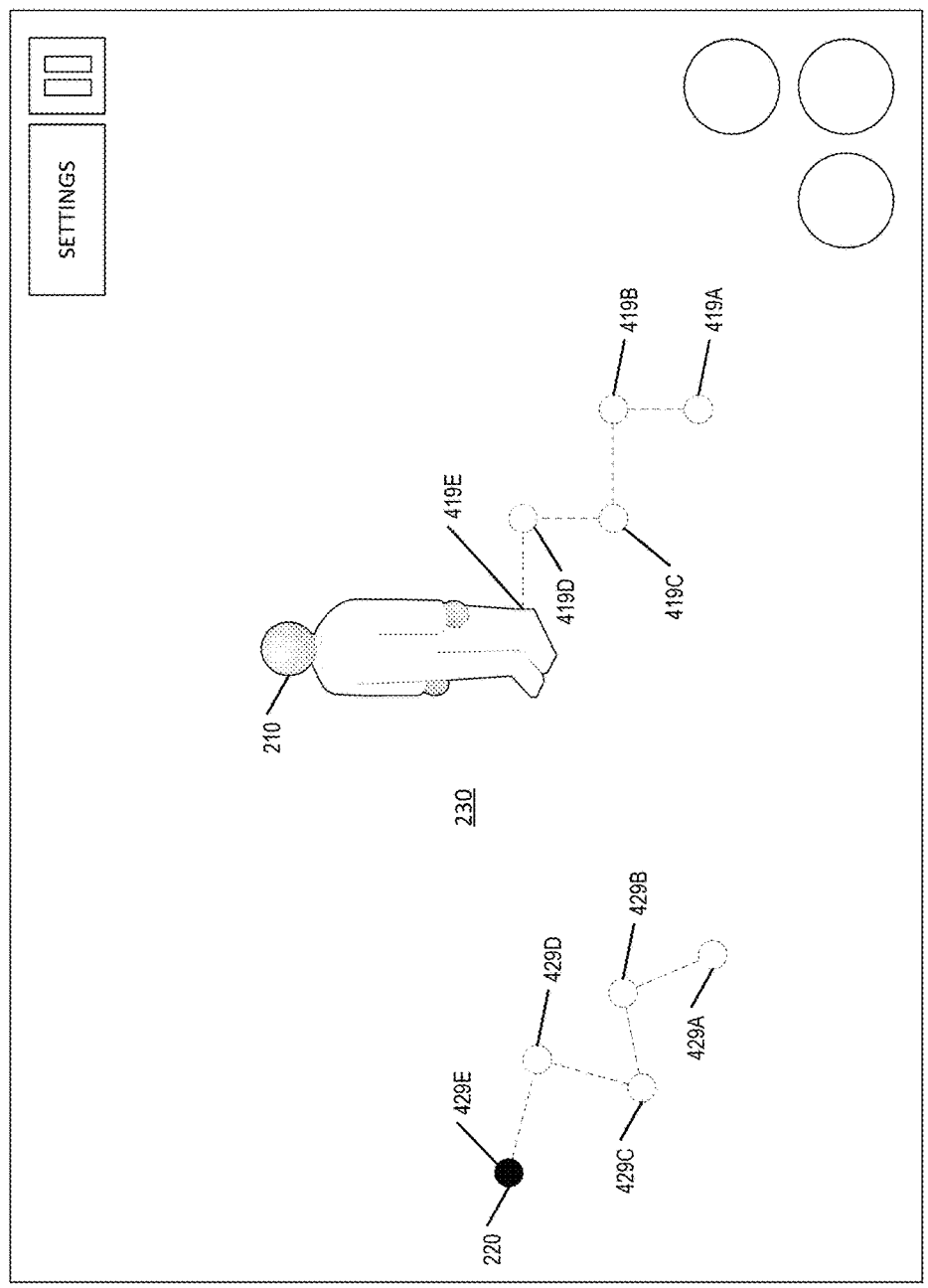

FIG. 4D illustrates an example embodiment of quantizing direction within a game environment. In some game applications, control of a character 210 may be restricted to a limited number of directions. The character 210 may not have 360 degrees of control for movement in the game environment. For example, the game environment may only provide for directional movement in four directions such as up, down, left and right. Depending on the specific game application 110 and the game rules that are associated with that game environment 230, the touch inputs 220 that are received may need to be modified according to the defined restraints implemented by the game engine 112.

For example, in the illustrated embodiment the character 210 is capable of moving in four directions within the game environment 230. The touch input 220 moves through positions 429A to position 429E. As illustrated, the character 210 moves from position 419A through 419E. The general directions are determined and translated by the game engine based on the touch input 220. As illustrated, the touch inputs 429A-429E correspond to movement of the character 210 along 419A-419E. Advantageously, in certain embodiments, this allows for a touch input control scheme to be used without requiring rigid application of control restraints within the game environment.

Figure 5A:
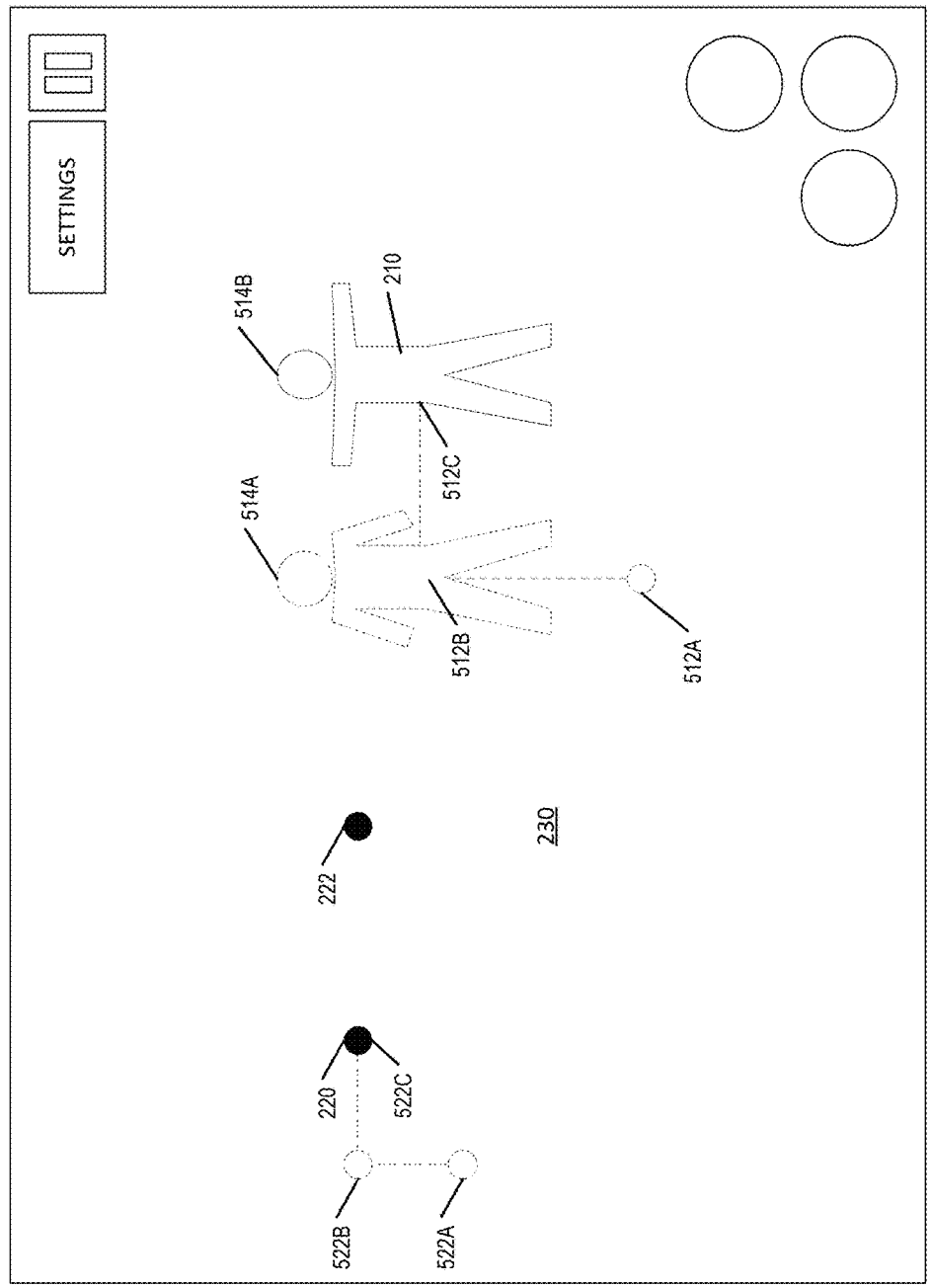
FIGS. 5A and 5B illustrate an embodiment of an interface of a touchscreen device that illustrates that implements a multi-touch process.
Figure 5B:
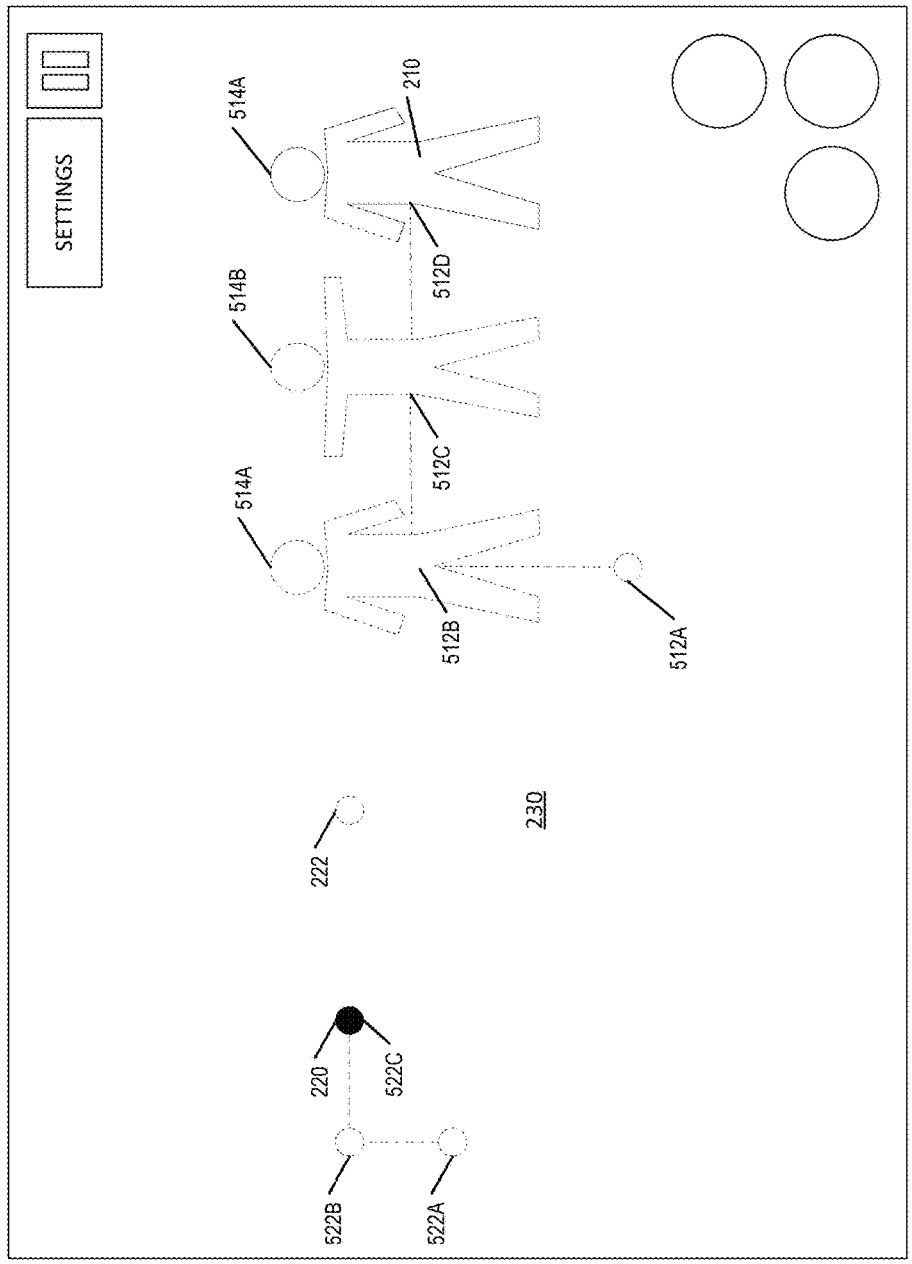

FIGS. 5A and 5B illustrate embodiments of a multi-touch process where the system can process multiple different touch inputs 220 and 222 from the touchscreen device. FIG. 6A illustrates a primary touch input 220, a secondary touch input 222, and the character 210. The path of the primary touch input 220 moves from 522A to 522B to 522C, and the secondary touch input 222 is in a single location. Movement of the character 210 is illustrated along the path 512A through 512C. The specific posing or actions associated with the character 210 are illustrated with reference to 514A and 514B. At position 512B the character is in the pose 514A with the arms in a downward position. In position 512C, the current position, the character's arms are in an upward position. The example secondary touch 222 may be a tap on the screen. The game engine 112 can process the primary touch 220 and the secondary touch 222 simultaneously.

The game engine 112, the touchscreen interface 104, or other system can assign different identifiers for the primary touch 220 and the secondary touch 222 in order to track the different touch inputs independently. Each touch input can be independent of the other touch input such that the game engine 112 can provide functionality based on the specific parameters and commands associated with each touch input. In other embodiments, two or more of the touch inputs may be inter-related such that a left movement of primary touch 220 with a single tap for secondary touch 222 may indicate one action (for example, jump left), while a left movement of primary touch 220 with a double tap for secondary touch 222 may indicate a different action (for example, run left). In this embodiment, the primary touch 220 is associated with movement of the character, and the secondary touch 222 is associated with an action. That action is illustrated by the movement of the character in 514B where the character moves the arms up. The action 514B is illustrative of a specific action. However, any action could be performed based on the specific operation of the game application 110. For example the action could be a punch, a kick, actuation of a device, weapon, or any other type of action available within the game environment. The secondary touch command can determined in accordance with the secondary touch input 222.

FIG. 5B illustrates a time period after the secondary touch input 222 has been removed and the primary touch input 220 remains. In this embodiment, the action illustrated in 514B by the character is no longer occurring and the game engine 112 continues to execute the command associated with the primary touch input 220. The system can continue to execute the commands from multiple touch inputs simultaneously. In the embodiments in FIGS. 5A and 5B, only two touch inputs are illustrated, however, the system can be configured to process any number of touch inputs.

Process for Touch-Based Manipulation of a Character in a Game Environment

Figure 6:
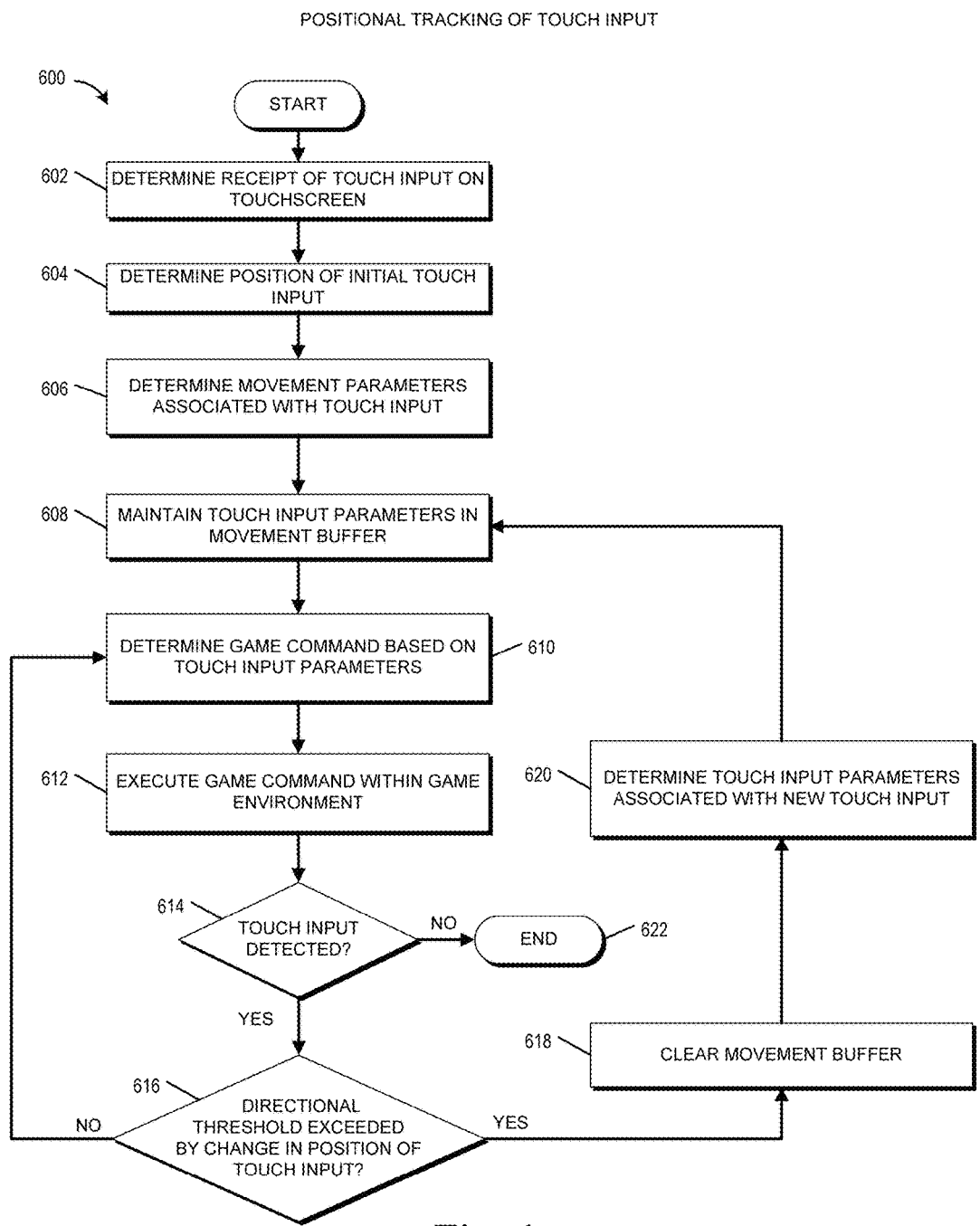
FIG. 6 illustrates an embodiment of a process for touch-based manipulation of a character in a game environment.

FIG. 6 illustrates an embodiment of a process 600 for touch-based manipulation of a character in a game environment. The process 600 can be implemented by any system that can process the tracking of touch inputs on a touchscreen. For example, the process 600, in whole or in part, can be implemented by a game engine 112 or the game application 110. Although any number of systems, in whole or in part, can implement the process 600, to simplify discussion, the process 600 will be described with respect to particular systems. Further, although embodiments of the process 600 may be performed with respect to any type of user controlled entity within the game, to simplify discussion, the process 600 will be described with respect to a character within the game application 110.

At block 602, the game engine 112 determines receipt of a touch input on the touchscreen. The receipt of the touch input can be assigned a touch identifier that can be used to track the position and other touch input data associated with the touch input. Additionally, the game engine 112 can have a movement buffer that can be used to store data associated with the specific touch input. At block 604, the game engine 112 can determine the initial position of the touch input. The initial position of the touch input can be used for tracking changes in position relative to the initial position.

At block 606, the game engine can determine the movement parameters associated with the touch input, such as direction, momentum and/or speed. The touch input parameters can be used to determine movement relative to the initial touch input. The game engine 112 can analyze the positional data direction, momentum, speed, and/or other touch input parameters. The touch input data can be updated as frequently as required or desired by the touchscreen interface 104, the game engine 112, or other component of the computing device 100. For example, the touch input parameters may be updated multiple times per second and provided to the game engine 112 automatically. In some embodiments, the game engine 112 can poll the touchscreen interface 104 at a defined frequency to receive the touch input parameters.

At block 608, the touch input parameters associated with the touch input are stored within a movement buffer. The movement buffer can continually or periodically store the parameters associated with the current position relative to the previous position. For example, if the touch input moves from an initial position to a second position the speed, momentum and touch information can be stored. In some embodiments, the touch input parameters are maintained in the movement buffer until the touch input is removed or the movement buffer is cleared.

At block 610, the game engine 112 determines a movement command associated with the touch input parameter information stored in the movement buffer. Based on the touch input parameters, such as speed, direction, pressure, and/or movement, the game engine 112 can then determine a movement command or other game command. For example, the game engine 112 can determine how to control the movement of a character within the game environment 230. At block 614, that movement command can be executed within the game environment. For example, the game engine 112 can execute the movement command in concert with other components of the game application 110 in order to render and output the executed command to the user on the display.

At block 614, the game engine determines whether that touch input is still detected. If the touch input is no longer detected, such as the user removed his finger or input device from the touchscreen, the process ends and the buffer is emptied. If the touch input is still detected, the game engine continues to analyze the movement parameters associated with the touch input. The game engine 112 can continue to execute an existing command if additional touch input data has not been received. If the touch input is removed, the process proceeds to block 622, the movement buffer is cleared and execution of any commands associated with the touch can be stopped.

At block 616, the game engine 112 determines whether a directional threshold is exceeded by a change in position or movement of the touch input. If the directional threshold is exceeded, the game engine 112 can clear the movement buffer at block 618. When the movement buffer is cleared, the touch input parameters are removed and is no longer used by the game engine for the determination and execution of commands within the game environment 230. In some embodiments, a different buffer or a different location within the buffer could be used to store the new touch input parameters associated with the new touch input. At block 620, the game engine determines the touch input parameters, such as direction, momentum, and/or speed of the touch input, based on the new touch input. The process returns to block 608 and maintains the touch information within the movement buffer and continues with the process.

If at decision block 616 the directional threshold is not exceeded, the game engine 112 can continue to determine the movement of the character based on the touch input parameters stored in the movement buffer. For example, the game engine can continually update the positional information to change the movement of the character corresponding to the movement of the touch input based on current and previous information stored in the movement buffer. The game engine 112 can continue to use the touch input parameters stored in the movement buffer to determine and execute the appropriate game command until that directional threshold is exceeded or the touch input is removed.

Process for Tracking Multiple Touch Inputs

Figure 7:
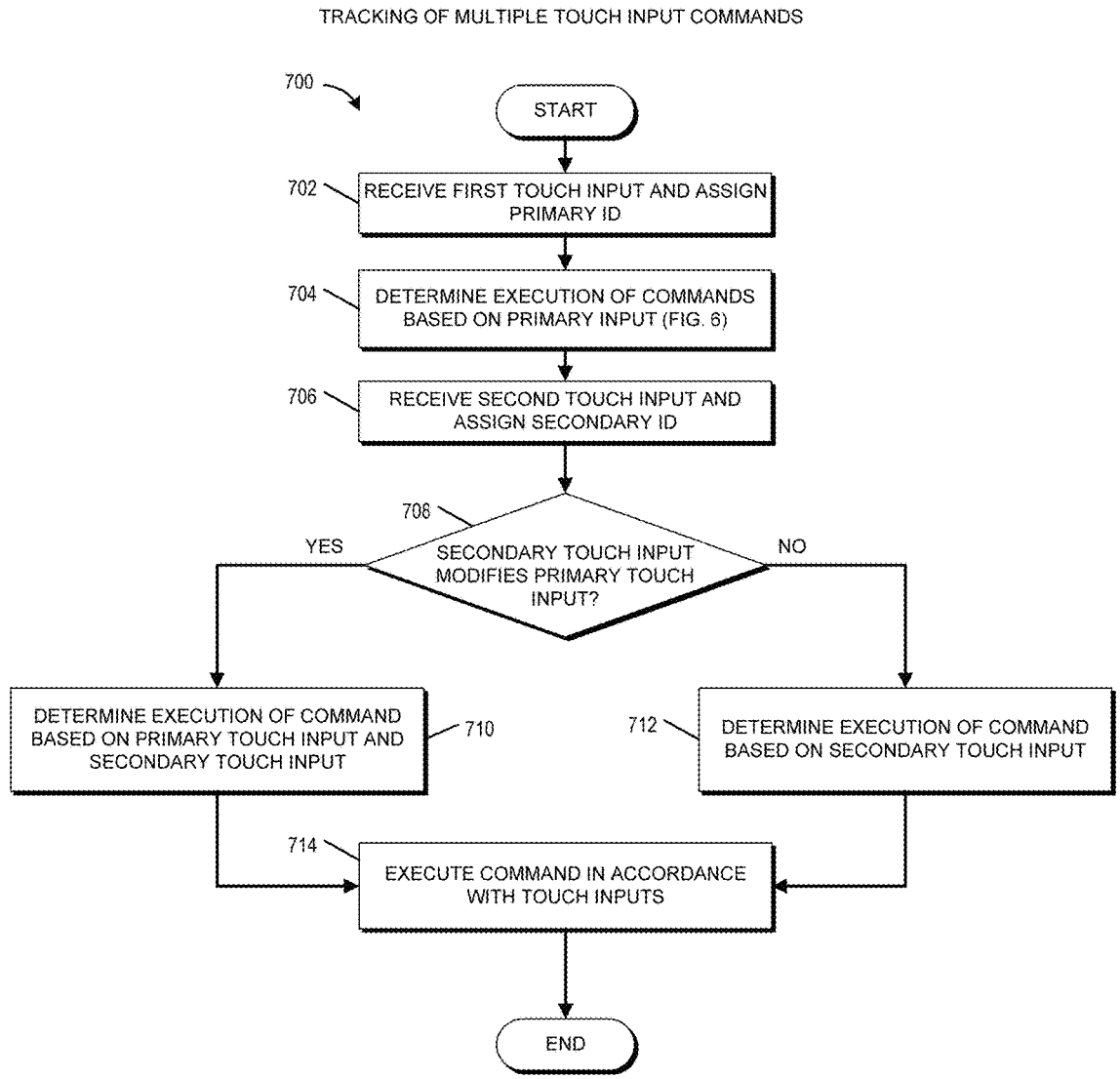
FIG. 7 illustrates an embodiment of a flowchart of a process for tracking multiple touch inputs.

FIG. 7 illustrates an embodiment of a flowchart 700 of a process for tracking multiple touch inputs. The process 700 can be implemented by any system that can process the tracking of multiple touch inputs on a touchscreen. For example, the process 700, in whole or in part, can be implemented by a game engine 112, or the game application. Although any number of systems, in whole or in part, can implement the process 700, to simplify discussion, the process 700 will be described with respect to particular systems. Further, although embodiments of the process 700 may be performed with respect to any type of user controlled entity within the game, to simplify discussion, the process 700 will be described with respect to a character within the game application 110.

At block 702, the touchscreen receives a first touch input and assigns a primary identifier. The first touch input can be referred to as the primary touch input. In some embodiments, the game engine 112 can determine that the primary touch input is configured to control movement of the character within the game environment and other touch inputs can control different aspects. At block 704, the game engine can determine and execute commands associated with the primary touch input can be determined. In some embodiments, the primary touch input can be processed in accordance with process 600 described in FIG. 6.

At block 706, the touchscreen can receive a second touch input and assign a secondary identifier. The second touch input can be referred to as the secondary touch input. Block 706 can occur concurrently with execution of commands associated with blocks 702 and/or 704. Each touch input can have a separate buffer and touch input data associated with the touch input can be allocated buffer in accordance with the assigned identifier.

At block 708, the game engine can determine whether the secondary touch input modifies the primary touch input. For example, the primary touch input can provide movement within of a character within a game environment. The secondary touch input can, depending on the type of touch input, modify the behavior of the first touch input. For example, in a fighting game the primary input may correspond to movement and the received secondary touch input may correspond to a block action by the character. The block action can pause movement of the character while the block action is in effect. Other actions may occur independent of the actions or commands associated with the first touch input.

If the secondary touch input modifies the primary touch input then the process proceeds to block 710 at which point the game engine determines execution of the command based on the primary touch input and the secondary touch input. If the secondary touch input does not modify the primary touch input the process proceeds to block 712.

At block 712, the execution of a command or function associated with the secondary touch input is determined based on the touch input data corresponding to the secondary touch input. For example, a secondary touch input could be a tap or a swipe on the touchscreen which would result in a type of action. In the example of the fighting game, a tap or a swipe could correspond to a punch or a kick within the game that may occur regardless of the specific movement of the character.

At block 714, after the touch input commands have been received and processed, the game engine 112 can execute the specific command(s) within the game environment. For example, the commands can be provided to the various other game application components for rendering and outputting to the display device. After execution of the secondary touch input the system can resume the primary touch input commands. The process can also be configured to use multiple touch inputs, such as a third or fourth touch inputs.

Overview of Computing Device

Figure 8:
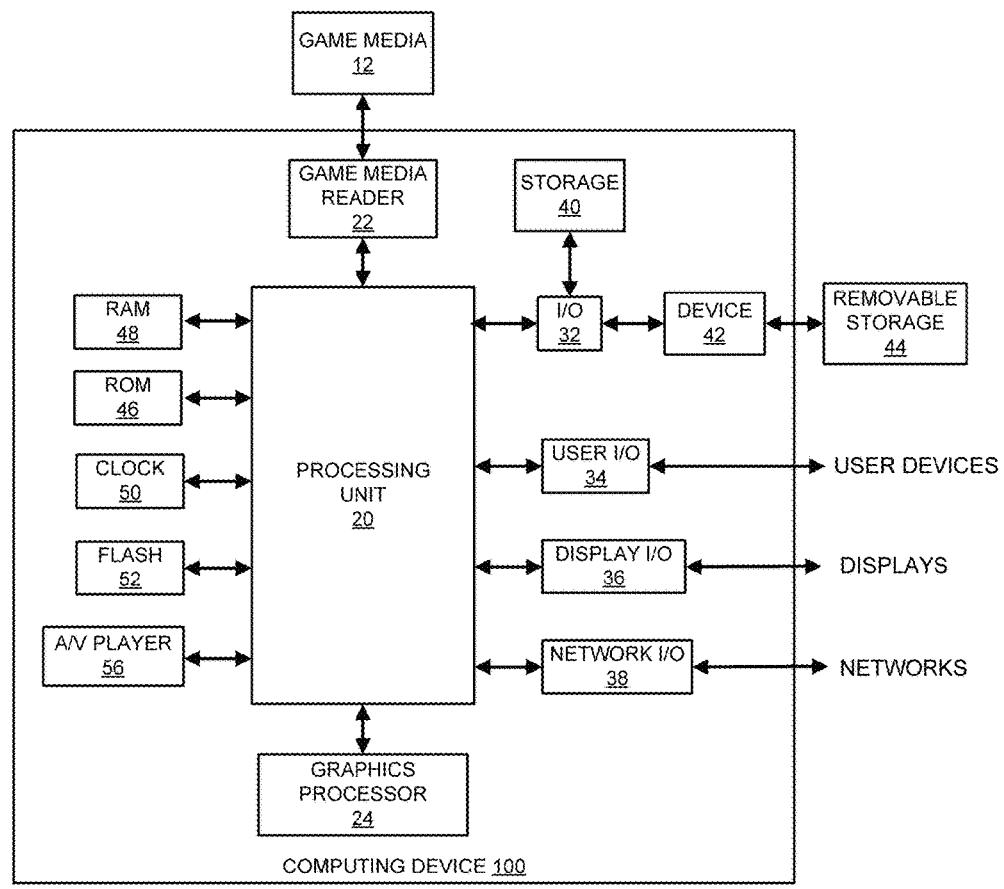
FIG. 8 illustrates an embodiment of a computing device.

FIG. 8 illustrates an embodiment of computing device 100 according to the present disclosure. Other variations of the computing device 100 may be substituted for the examples explicitly presented herein, such as removing or adding components to the game device. The computing device 100 may include a game device, a smart phone, a tablet, a personal computer, a laptop, a smart television, a car console display, and the like. As shown, the computing device 100 includes a processing unit 20 that interacts with other components of the computing device 100 and also external components to computing device 100. A game media reader 22 is included that communicates with game media 12. Game media reader 22 may be an optical disc reader capable of reading optical discs, such as CD-ROM or DVDs, or any other type of reader that can receive and read data from game media 12.

Computing device 100 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 100 may include a discrete graphics processor 24 that is separate from the processing unit 20. In some such cases, the graphics processor 24 may have separate RAM from the processing unit 20. Computing device 100 might be a handheld video game device, a dedicated game console computing system, a general-purpose laptop or desktop computer, a smart phone, a tablet, a car console, or other suitable system.

Computing device 100 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 100. Processing unit 20 can communicate through I/O 32 to store data, such as game state data and any shared data files. In addition to storage 40 and removable storage media 44, computing device 100 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 100 on a display device, such as graphics, user interfaces, video, and/or other visual content. Computing device 100 may comprise one or more integrated displays configured to receive display output signals produced by display I/O 36. According to some embodiments, display output signals produced by display I/O 36 may also be output to one or more display devices external to computing device 100, such a display 16.

The computing device 100 can also include other features that may be used with a game, such as a clock 50, flash memory 52, and other components. An audio/video player 56 might also be used to play a video sequence, such as a movie. It should be understood that other components may be provided in computing device 100 and that a person skilled in the art will appreciate other variations of computing device 100.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing device 100 is turned off or loses power.

As computing device 100 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for touch-based control of a game application, the method comprising:
by a hardware processor executing a game application,
receiving, by the game application, a touch input via a touchscreen, wherein the touch input is configured to control operation of a virtual entity within a game environment of the game application;
determining, by the game application, first movement data associated with the touch input, wherein the first movement data defines a first direction;
storing, by the game application, the first movement data in a movement buffer;
determining, by the game application, a movement command for the virtual entity within the game environment of the game application based, at least in part on the first movement data stored in the movement buffer;
executing, by the game application, the first movement command by the virtual entity within the game environment;

responsive to movement of the touch input in a second direction, determining, by the game application, second movement data associated with the touch input, wherein the second movement data defines the second direction;

determining, by the game application, whether the second movement data associated with the touch input overcomes a directional threshold by comparing the first movement data to the second movement data, wherein the directional threshold defines an angular value;

if the second movement data satisfies the directional threshold,
- clearing the first movement data from the movement buffer;
- storing the second movement data in the movement buffer;
- determining a second movement command for the virtual entity within the game environment based, at least in part on the second movement data stored in the movement buffer; and
- executing, by the game application, the second movement command by the virtual entity within the game environment;

if the second movement data does not overcome the directional threshold,
- storing the second movement data in the movement buffer; and
- determining a third movement command for a character within a game environment based, at least in part on the first movement data and the second movement data and
- executing, by the game application, the third movement command by the virtual entity within the game environment.

2. The computer-implemented method of claim 1, further comprising:
- detecting a removal of the touch input from the touchscreen;
- in response to detecting removal of the touch input, clearing the movement buffer.

3. The computer-implemented method of claim 1, wherein the virtual entity is controlled by the user.

4. The computer-implemented method of claim 1, wherein the game environment is a two-dimensional or three-dimensional game environment.

5. The computer-implemented method of claim 1, wherein the first movement data comprises at least one of: shape, size, pressure, location, direction, momentum, or duration of the touch input.

6. A system for touch-based control of a game application, comprising:
- a data store configured to store game application data;
- a hardware processor in communication with the data store and a touch screen interface, the touchscreen interface configured to translate tactile inputs received by a touchscreen into touch input data based on the characteristics of the tactile inputs, the hardware processor configured to execute a game application based, at least in part, on the game application data, wherein the game application is configured to:
  - receive first touch input data associated with a tactile input, wherein the tactile input is configured to control a virtual entity within a game environment of the game application;
  - store the first touch input data in a movement buffer;
  - determine a first command for the virtual entity within the game environment of the game application based, at least in part on the first touch input data stored in the movement buffer;
  - execute the first command for the virtual entity within the game environment of the game application;
  - receive second touch input data associated with the tactile input;
  - based on a determination that the second touch input data overcomes a directional threshold relative to the first touch input data, clear the first input data from the movement buffer, wherein the directional threshold defines an angular value;
  - store the second input data in the movement buffer;
  - determine a second command for the virtual entity within the game environment of the game application based, at least in part on the second touch input data stored in the movement buffer;
  - execute the second command for the virtual entity within the game environment of the game application.

7. The system of claim 6, wherein the game application includes a two-dimensional or three-dimensional game environment.

8. The system of claim 6, wherein based on a determination that the second input data do not overcome a directional threshold relative to the first input data, storing the second input data in the movement buffer; and determining a third movement command for a character within a game environment based, at least in part on the first input data and the second input data.

9. The system of claim 6, wherein the first input data comprise a first directional vector, and the second input data comprise a second directional vector.

10. The system of claim 6, wherein the game application is further configured to:
- detect a removal of the touch input from the touchscreen;
- in response to detecting removal of the touch input, clear the movement buffer.

11. The system of claim 6, wherein the game application is further configured to:
- assign the touch input a first identifier;
- receive a second touch input;
- assign the second touch input a second identifier; and
- store movement data associated with the second touch input in a second movement buffer associated with the second identifier.

12. The system of claim 11, wherein the game application is further configured to:
- based on a determination that the second touch input modifies the command associated with the touch input, execute the modification to the command.

13. The system of claim 6, wherein, the command controls a movement of the virtual entity within the game application.

14. The system of claim 6, wherein the virtual entity is controlled by a user.

15. The computer-implemented method of claim 1, wherein the first input data comprises at least one of: shape, size, pressure, location, direction, momentum, or duration of the touch input.

16. A non-transitory computer readable medium comprising computer-executable instructions for touch-based control of a game application that, when executed by a computer, cause the computer to perform a method comprising:

receiving first touch input data associated with a tactile input, wherein the tactile input is configured to control a virtual entity within a game environment of the game application;

storing the first touch input data in a movement buffer;

determining a first command for the virtual entity within the game environment of the game application based, at least in part on the first touch input data stored in the movement buffer;

executing the first command for the virtual entity within the game environment of the game application;

receiving second touch input data associated with the tactile input;

based on a determination that the second touch input data overcomes a directional threshold relative to the first touch input data, clearing the first input data from the movement buffer, wherein the directional threshold defines an angular value;

storing the second touch input data in the movement buffer;

determining a second command for the virtual entity within the game environment based, at least in part on the second touch input data stored in the movement buffer; and executing the second command for the virtual entity within the game environment of the game application.

17. The non-transitory medium of claim 16, wherein the method further comprises:

based on a determination that the second input data do not overcome a directional threshold relative to the first input data, storing the second input data in the buffer; and determining third movement command for a character within a game environment based, at least in part on the first input data and the second input data.

18. The non-transitory medium of claim 16, wherein the first input data comprise a first directional vector, and the second input data comprise a second directional vector.

19. The non-transitory medium of claim 16 further comprising:

detecting a removal of the touch input from the touchscreen; and in response to detecting removal of the touch input, clearing the movement buffer.

* * * * *